Oct. 17, 1950  C. T. LANE ET AL  2,525,807
STORAGE OF LIQUEFIED GAS
Filed May 15, 1946
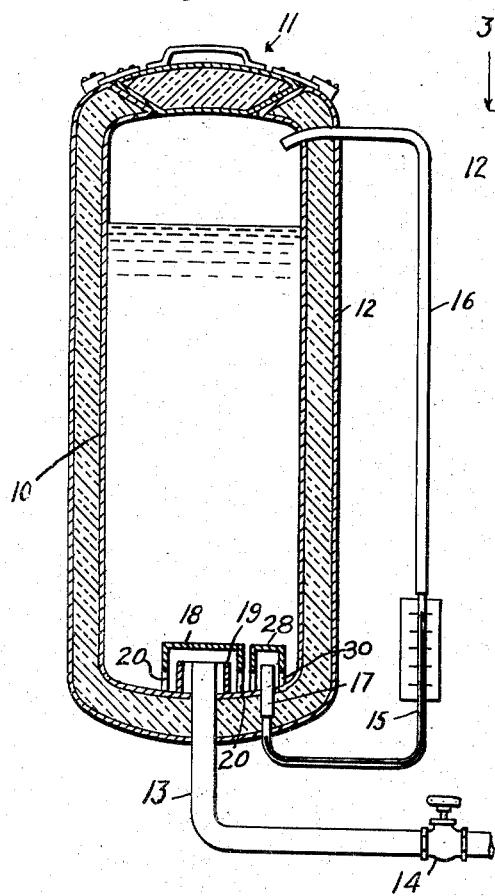
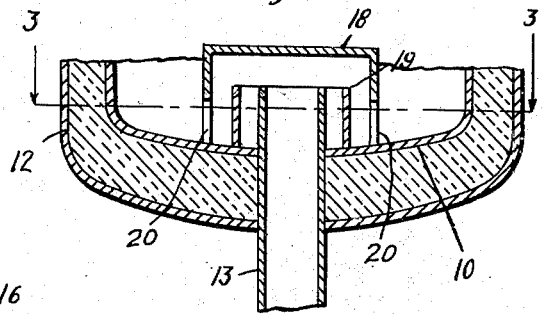
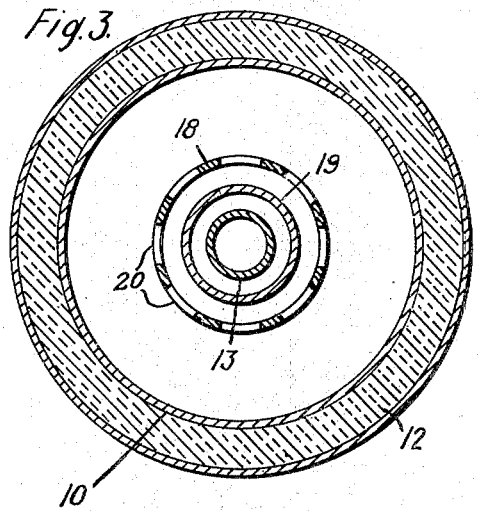
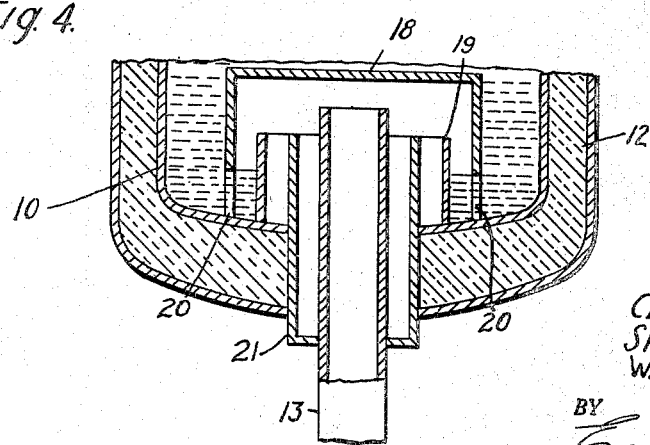
INVENTORS
CECIL T. LANE
SIDNEY C. MARSH
WALTER M. HAESSLER
BY
Ernest A. Joerren
ATTORNEY Patented Oct. 17, 1950

2,525,807

UNITED STATES PATENT OFFICE 2,525,807

STORAGE OF LIQUEFIED GAS

Cecil T. Lane, North Haven, Conn., and Sidney C. Marsh, Hohokus, and Walter M. Haessler, Jersey City, N. J., assignors to Specialties Development Corporation, Belleville, N. J., a corporation of New Jersey Application May 15, 1946, Serial No. 669,896

6 Claims. (Cl. 62—1)

This invention relates to the storage of liquefied gas, and particularly to a vapor trap for the discharge or liquid level indicator line of the vessel in which the gas is stored.

In the storage of relatively large volumes of liquefied gas at lower than usual atmospheric temperatures established and maintained by refrigeration, it is customary to provide a vessel adapted to withstand substantial internal pressures which is surrounded by insulation to minimize the leakage of heat into the vessel.

Such vessels usually are provided with a discharge or outlet line at the lower end thereof which in the past have been heavily insulated, at least as far as to the discharge valve. Even so, a certain amount of boiling of the liquefied gas takes place within the discharge line due to the fact that no insulation can be made completely effective so as to eliminate the transfer of heat to the discharge line and thus to the liquefied gas within the line which heat is ultimately transferred into the vessel. The liquefied gas which is vaporized is constantly replaced by additional liquefied gas from the vessel and is vaporized, whereby even a relatively slight heat loss is objectionable.

It is also desirable to provide some means for indicating the liquid level within the vessel. Various means have been used for this purpose, but those which gave an accurate indication were unduly complicated in design and operation. For example, a simple sight glass on the side of the vessel cannot be used because the heat leakage into the liquid level line and the sight glass causes the liquefied gas in the sight glass to boil violently, rendering any reading very inaccurate. Also, due to the relatively low temperature of the liquefied gas, moisture in the air is condensed and frozen to form a heavy coating of ice on the exterior of the sight glass rendering reading of the liquid level impossible.

Liquefied gases, and particularly carbon dioxide, usually contains a certain amount of water, both dissolved in the liquid and held in suspension therein in the form of minute ice crystals. Upon boiling of this liquid, the dissolved water immediately comes out of solution, freezes and accumulates at the point of boiling, together with the crystals formerly in suspension. Upon a continued boiling at any particular point, the ice will accumulate at that point. This is very undesirable where an accumulation forms in a conduit or other point where it will interfere with passage of fluid. For this reason, as well as the reasons above discussed, in the past, it has been impracticable to use an ordinary sight glass for determining the liquid level in the vessel, inasmuch as continued boiling within the liquid level line leading from the bottom of the vessel to the sight glass soon blocks this line with ice, thereby rendering the reading of the liquid level inaccurate and misleading. Further, such continued boiling raises the pressure within the vessel and may require additional refrigeration in order to maintain the vessel within reasonable pressure limits. Even if the pipe leading from the bottom of the vessel is heavily insulated, some boiling inevitably occurs within the pipe and it is simply a matter of time until an ice block is formed.

Accordingly, an object of the present invention is to provide a simple device adapted to overcome the above-mentioned objectionable features, which is simple and durable in construction, economical to manufacture and effective in its operation.

Another object is to provide a device for maintaining and retaining vapor within a discharge or liquid level indicator line in order to minimize transfer of heat to the interior of the vessel.

Another object is to minimize the deposition of ice crystals within such lines by minimizing boiling of the liquefied gas therein.

Another object is to obviate the necessity for insulating a discharge line or liquid level indicator line leading from such a vessel.

Another object is to prevent the formation of ice upon the outer surface of a sight glass used in connection with the vessel to indicate the volume of liquid therein.

A further object is to prevent the entrance of solid carbon dioxide or foreign matter into the discharge or liquid level indicator lines.

Other and further objects of the invention will be obvious upon an understanding of the illustrative embodiment about to be described, or will be indicated in the appended claims, and various advantages not referred to herein will occur to one skilled in the art upon employment of the invention in practice.

In the accompanying drawing, forming a part of the specification:

Figure 1 is a sectional view in elevation of a pressure vessel, showing a discharge line and liquid level indicator line equipped with a vapor trap embodying the invention.

Figure 2 is an enlarged sectional view of the vapor trap, as applied to the discharge line.

Figure 3 is an enlarged top sectional view of the vapor trap taken on lines 3—3 of Figure 2.

Figure 4 is an enlarged sectional view similar to Figure 2 of a modified form of the vapor trap.

Referring to Figure 1, a vessel 10 of a conventional type is shown, having a cover 11 for charging the same with solidified gas, such as carbon dioxide ice. If desired liquefied gas may be introduced into the vessel 10 by means of a pipe, not shown, as is well known in the art. It is customary to provide an insulating jacket 12 about the pressure vessel 10 in order to minimize transfer of heat to the interior of the vessel. A discharge line 13 is provided leading from the bottom of the vessel 10 and has therein a valve 14 for controlling the discharge of liquefied gas from the vessel.

A liquid level indicator 15 is shown at the side of the vessel in order to indicate the level of liquefied gas within the vessel. This indicator is preferably a manometer having a generally U-shaped section partly filled with mercury. The two legs of the U-shaped manometer are connected by lines 16 and 17 to the top and bottom of the vessel, respectively, in order to measure the pressure differential between these two points, which is due to the hydrostatic pressure of the liquid in the vessel. A conventional manometer may be used, or one leg of the manometer may be combined with the line to the bottom of the vessel as shown in Figure 1 of the drawing.

In accordance with the invention, the discharge and liquid level lines are provided with a trap, as about to be described.

At the point where the discharge line 13 enters the vessel, an inverted bell-shaped chamber 18 is secured in place by fastening to the inner wall of the vessel or to the end of the discharge line 13. The chamber 18 is provided with one or more apertures 20 below the terminal end of the discharge line 13 in order to establish communication between the inside of the chamber and the interior of the vessel. One or more cylindrical baffles 19 are preferably interposed between the inner wall of the chamber 18 and the discharge line in order to prevent liquefied gas within the vessel from directly contacting the outside wall of the portion of the discharge line 13 within the vessel and thereby prevent transferring an excess amount of heat to the interior of the vessel. These baffles are preferably secured to the inner wall of the vessel 10 and prevent the passage of fluid therebetween. If one or more baffles 19 are used, it is not essential to bring the actual discharge line above the level of the openings 20 in the chamber 18, inasmuch as the interior of the innermost baffle may serve as a portion of the discharge line. It is obvious that this chamber with or without the baffle will effectively prevent entrance of foreign matter or solidified gas into the discharge line.

The structure herein described forms a vapor trap, retaining gas in vapor phase within the line except when liquefied gas is being discharged therethrough. Upon discharge of liquid through the discharge line 13 by operation of the valve 14, any vapor in the line is expelled through the valve and the discharge line is immediately filled with liquefied gas or gas in liquid phase passing therethrough. Upon closing the valve 14, the discharge line 13, which need not be insulated, immediately transfers heat from the outside atmosphere to the interior of the line, thus vaporizing the liquefied gas therein. This vapor will pass upward through the discharge line and through the vapor trap described until the pressure in the discharge line drops to the level of the pressure at the bottom of the vessel 10, at which time no further gas will pass through the vapor trap. The trap will also prevent any of the liquefied gas within the vessel from entering the discharge line 13 and displacing any of the residual quantity of gas in this line, thus preventing a continual vaporization of liquefied gas in the line.

The trap described herein will form a surface of liquefied gas within the trap with the gas in vapor phase of the discharge line disposed above and in contact with the surface of the liquid.

A vapor trap similar to that herein described, may be utilized for the lower line 17 of the liquid level indicator, in which case this line will initially fill with liquefied gas, which will be vaporized, after which time, no additional liquefied gas will enter.

It is contemplated that the discharge line or liquid level indicator line need not enter the bottom of the vessel 10, as disclosed in the drawing, but may be introduced through the side of the vessel if desired, it only being necessary to provide a bell-shaped chamber 28, having openings 30 therein, projecting below the entrance to such a line in order to trap vapor phase gas in the line.

As described above, the pressure within lower line 17 of the liquid level indicator will equalize with the pressure at the bottom of the vessel by vapor flowing through the trap and into the vessel. After equalization of pressure, no further flow will take place and the balance of the vapor will remain in the line to transmit the pressure at the bottom of the vessel to the manometer while insulating against the passage of heat to the interior of the vessel by virtue of the fact that a vapor phase gas is relatively a very poor transmitter of heat as compared with gas in liquid phase.

In the form of vapor trap disclosed in Figure 4 of the drawing, a cup-shaped member 21 surrounding the conduit 13 may be extended to the outside of the insulation whereby additional heat from the surrounding atmosphere may be supplied to the vapor therein to augment the heat supplied by the conduit in order to assure maintenance of vapor phase gas within the trap. This form of the invention is not required for the ordinary installation, but might be necessary if the body of the liquefied gas were subjected to a considerable drop in temperature due to refrigeration or withdrawal of vapor phase gas from the vessel.

Inasmuch as a continual boiling of liquefied gas within a discharge line or liquid level indicator line has been obviated by use of the vapor trap described, there is no material accumulation of ice within such a line which is caused by continuous boiling therein. Further, the gas in vapor state is a relatively poor conductor of heat as compared with gas in its liquid phase. Therefore, it is no longer necessary to resort to insulation of such lines in order to prevent entrance of heat to the interior of the vessel, thus making a cheaper, simpler, better product and better apparatus.

While the present invention has been described in connection with the storage of carbon dioxide by way of example, it will be understood that the invention may be utilized for storing other liquefiable gases such as, but not limited to, acetylene, ammonia, ethane, ethylene and nitrous oxide.

From the foregoing description, it is apparent that a vapor trap has been provided which has extremely simple, durable and economical construction, is of ready manufacture and application and is dependable and effective in operation.

As various changes may be made in the form, construction and arrangement of the parts herein, without departing from the spirit and scope of the invention and without sacrificing any of its advantages, it is to be understood that all matter herein is to be intrepreted as illustrative and not in any limiting sense.

It is also to be understood that the following claims are intended to cover all the generic and specific features of the invention herein described, and all statements of the scope of the invention which, as a matter fo language, might be seen to fall therebetween.

We claim:

1. In combination, a vessel for storing liquefied gas, a conduit having a portion extending upwardly through the bottom of said vessel provided with an opening in the upper end thereof located in the lower portion of said vessel and below the liquid level thereof, a bell-shaped chamber enclosing said conduit portion provided with a plurality of openings below the level of said conduit opening, and a plurality of concentric cylindrical baffle members in said chamber surrounding conduit portion.

2. In combination, a vessel for storing liquefied gas, a cup-shaped member extending upwardly through the bottom of said vessel into the lower portion of said vessel provided with an opening adjacent the bottom of said vessel and below the liquid level thereof, a conduit having a portion extending upwardly through said member provided with an opening just above the opening of said member, and a chamber enclosing said member and said conduit portion provided with an opening below the level of said conduit opening.

3. In combination, a vessel for storing liquefied gas, a cup-shaped member extending upwardly through the bottom of said vessel into the lower portion of said vessel provided with an opening adjacent the bottom of said vessel and below the liquid level thereof, a conduit having a portion extending upwardly through said member provided with an opening just above the opening of said member, a chamber enclosing said member and said conduit portion provided with an opening below the level of said conduit opening, and a baffle member in said chamber surrounding the upper end of said cup-shaped member.

4. In combination, a vessel for storing liquefied gas, a conduit having a portion extending upwardly through the bottom of said vessel and provided with an opening at its upper end located in the lower portion of said vessel and below the usual liquid level thereof, an inverted cup-shaped chamber enclosing said conduit portion and provided with an opening adjacent the bottom of said vessel and below the level of said conduit opening, and an imperforate tubular baffle member in said chamber extending upwardly from the bottom of said vessel and surrounding said conduit portion, said baffle member having an opening at its upper end positioned at a level above said chamber opening.

5. In combination, a vessel for storing liquefied gas, a conduit having a portion extending upwardly through the bottom of said vessel and provided with an opening at its upper end located in the lower portion of said vessel and below the usual liquid level thereof, an inverted cup-shaped chamber enclosing said conduit portion and provided with an opening adjacent the bottom of said vessel and below the level of said conduit opening, and an imperforate tubular baffle member in said chamber extending upwardly from the bottom of said vessel and surrounding said conduit portion, said baffle member having an opening at its upper end positioned at a level above said chamber opening and at about the level of said conduit opening.

6. In combination, a vessel for storing liquefied gas, a conduit having a portion extending upwardly through the bottom of said vessel and provided with an opening at its upper end located in the lower portion of said vessel and below the usual liquid level thereof, an inverted cup-shaped chamber enclosing said conduit portion and provided with an opening adjacent the bottom of said vessel and below the level of said conduit opening, and an imperforate tubular baffle member in said chamber extending upwardly from the bottom of said vessel and surrounding said conduit portion, said baffle member having an opening at its upper end positioned at a level above said chamber opening and just below the level of said conduit opening.

CECIL T. LANE.
SIDNEY C. MARSH.
WALTER M. HAESSLER.

REFERENCES CITED

The following references are of record in the file of this patent:

UNITED STATES PATENTS

| Number | Name | Date |
| --- | --- | --- |
| 1,478,479 | Lachmann | Dec. 25, 1923 |
| 1,544,854 | Mueller et al. | July 7, 1925 |
| 1,635,374 | Mapel | July 12, 1927 |
| 1,687,216 | King | Oct. 9, 1928 |
| 1,701,769 | Brown | Feb. 12, 1929 |
| 2,183,639 | Burdick | Dec. 19, 1939 |
| 2,237,052 | Gill | Apr. 1, 1941 |
| 2,242,108 | Bullowa et al. | May 13, 1941 |
| 2,326,511 | Zenner | Aug. 10, 1943 |